UNITED STATES PATENT OFFICE.

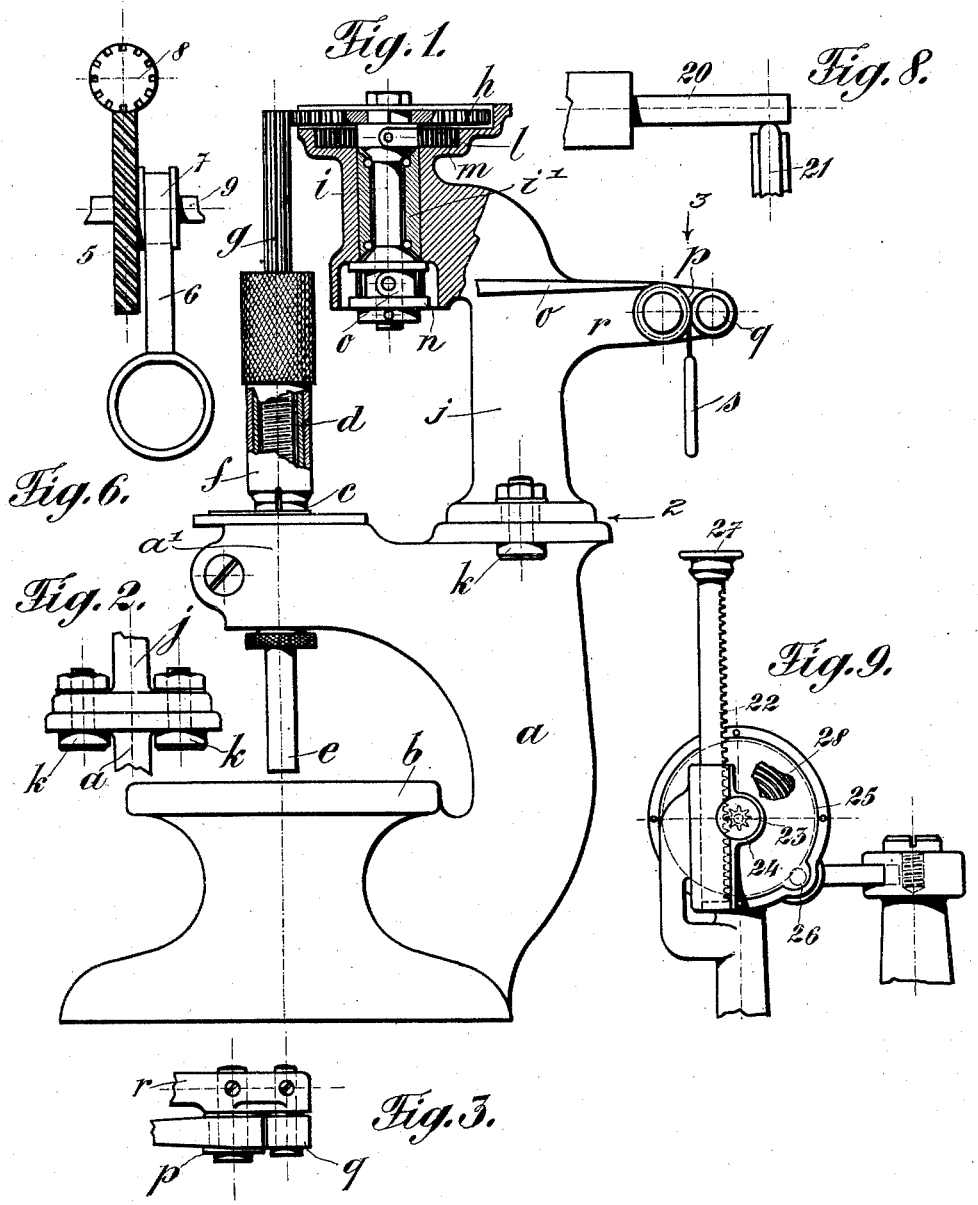

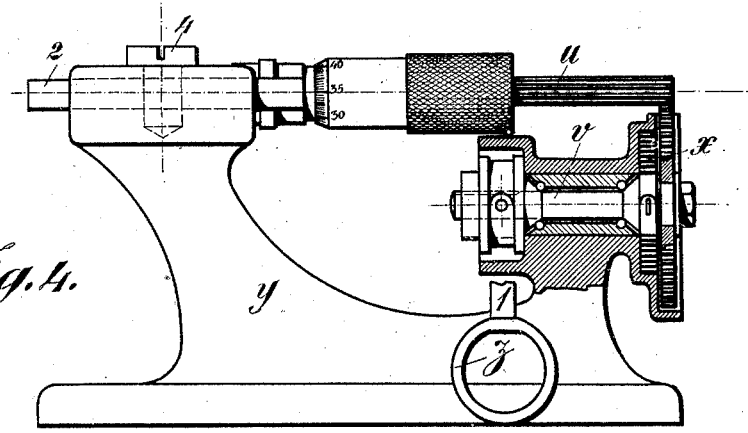
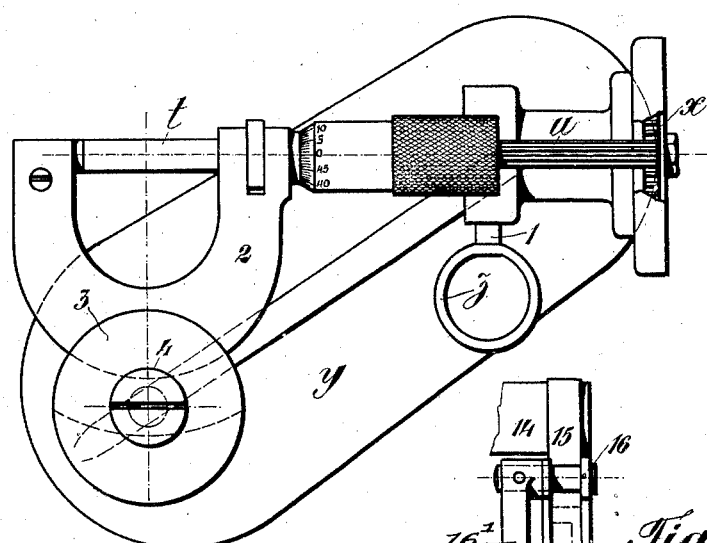
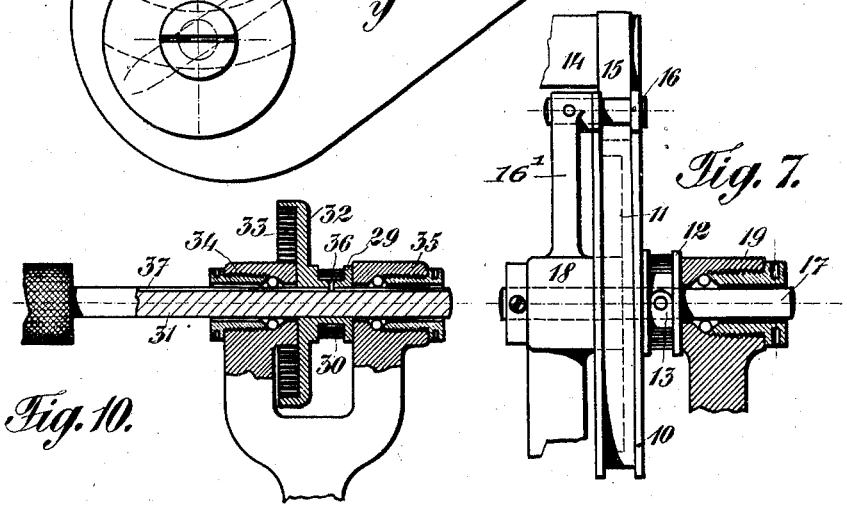

CHARLES SCHEIBENSTOCK, FILS, OF LA CHAUX DE FONDS, SWITZERLAND.

MEASURING INSTRUMENT.

No. 868,813.   Specification of Letters Patent.   Patented Oct. 22, 1907.

Application filed October 17, 1906. Serial No. 339,384.

*To all whom it may concern:*

Be it known that I, CHARLES SCHEIBENSTOCK, Fils, a citizen of the Republic of Switzerland, and a resident of Canton of Neuchâtel, Switzerland, have invented certain new and useful Improvements in Measuring Instruments, of which the following is a specification.

This invention relates to improvements in measuring instruments of that class which comprise a gaging spindle or member movably mounted in a support and a table or like means, which may be a separate structure, adapted to support the article to be measured and toward and from which the spindle is adapted to be displaced.

This invention relates more specifically to the provision of improved means for effecting rapid displacement of the spindle toward and from the supporting table and in the most preferred embodiment of the invention the means for displacing the spindle toward the table acts automatically and the device for displacing the spindle from the table is adapted to be manually operated and is desirably associated with said automatic means although not necessarily so.

The invention also contemplates the provision of power operating means for displacing the spindle away from said table.

The invention will be more fully described in connection with the accompanying drawings and will be more particularly set forth and ascertained in and by the appended claims.

In the drawings. Figure 1 is a view partly in elevation and partly in section of a measuring instrument embodying the main features of my invention, this embodiment of the invention showing the same in the form of a stationary measuring instrument. Fig. 2 is a detail view looking in the direction of the arrow 2 of Fig. 1. Fig. 3 is a detail view looking in the direction of the arrow 3 of Fig. 1. Fig. 4 is a side elevation partly in section of a modified form of the invention as applied to a portable measuring instrument. Fig. 5 is a plan view thereof. Fig. 6 is a detail view of a further modified form of the invention. Figs. 7, 8, 9 and 10 are views of further modifications of the invention.

Like numerals of reference designate similar parts throughout the different figures of the drawings.

The invention will now be described in connection with the specific embodiments shown but it will be understood that the invention is not to be limited to such specific showing except for such limitations as the claims impart.

First referring to the structure shown in Figs. 1 to 3 inclusive $a$ designates a base provided with a table or similar means of support $b$ for the article to be measured and having an extension which provides a support $a'$ for a gaging spindle designated by $e$. Said spindle $e$ may be in the form of the usual micrometer screw and as shown is provided with threads $d$ whereby threaded connection is afforded with the support $a'$.

If desired the spindle may be provided with the usual gaging sleeve $f$ and nut $c$ which latter may be mounted directly in the support $a'$ and afford threaded connection for the gaging spindle therewith. As the specific construction of this feature forms no part of the present invention it need not be herein specifically described in greater detail as the invention contemplates broadly a support for the spindle in which the latter is movably mounted. At its upper end the spindle is provided with relatively long longitudinally disposed gear teeth $g$ so proportioned as regards their length as to substantially equal the extent of movement which the spindle is adapted to have. Means are provided, which preferably act automatically, for engaging said spindle to normally displace the same toward the table or support $b$ and as shown said means is provided with a fixed mounting and is adapted to be operatively and slidably associated with the gaging spindle to effect displacement thereof. As shown a gear wheel $h$ is provided and is adapted to mesh with the teeth $g$ and thereby rotate the gaging spindle which rotation serves by means of the threaded engagement of said spindle with its support $a'$ to displace the spindle in opposite directions in accordance with the direction of rotation imparted thereto. Means are provided for normally acting through said gear wheel $h$ to rotate the spindle in a direction to displace the same toward the table $b$ and as shown said means consists of a spring $m$. An operating spindle $i$, preferably disposed in parallel relation with the gaging spindle is mounted in a bushing $i'$ secured in any desirable manner in a support $j$ adapted to be anchored to the base $a$ by bolts $k$ as clearly shown in Figs. 1 and 2. Said support $j$ is provided at its upper end with a housing $l$ adapted to inclose the spring $m$ and preferably the gear wheel $h$. Said gear wheel $h$ is mounted on the upper end of the operating spindle $i$ and immediately below the gear wheel $h$ is disposed the spring $m$, one end of which is fixed to the spindle $i$ and the other end of which may be secured to any stationary part such as the housing $l$. Said spring is normally maintained under tension so as to at all times act through the gear wheel $h$ to displace the spindle $e$ toward the table $b$. If desired the operating spindle $i$ may be mounted on ball bearings in the bushing $i'$ in the manner shown in Fig. 1.

In order to permit the insertion of the article to be measured between the lower end of the spindle $e$ and the table $b$ means are provided for displacing the spindle $e$ away from said table $b$ and as shown said means is embodied in the form of a manually operable device which acts through the operating spindle $i$ in the performance of its function. Referring specifically to said device $n$ designates a spool mounted on the lower end of the operating spindle $i$ and $o$ designates a steel ribbon or like suitable means which at one end is wound about the spool $n$ and is secured thereto. At its other end said ribbon $o$ is trained about a roller $p$ and carries on its projecting end a ring $s$. If desired a roller $q$ may be provided to maintain the ribbon $o$ in place upon the roller $p$. As shown both of said rollers are mounted on an extension $r$ extending rearwardly from the support $j$. The ribbon $o$ and the spring $m$ are wound or associated with the spindle $i$ in opposite directions or in a manner to rotate the same oppositely when acted upon. It will be obvious from the foregoing that as the ring $s$ is depressed from the position shown the ribbon $o$ will be unwound on the spool $n$ and the spindle $i$ will be rotated in a manner to displace the gaging spindle away from the table $b$ in order to permit the insertion of the articles to be measured. After the article has been measured and the ring $s$ is released the tension placed upon the spring $m$ by depression of the ring $s$ will serve to displace the gaging spindle toward the table $b$ until the lower end of said spindle engages the article to be measured whereupon the measurement may be observed from the usual form of graduations or indicator not herein shown.

In the form shown in Figs. 4 and 5 the gaging spindle is horizontally disposed in a support $y$. In this form the gaging spindle is mounted in a U-shaped micrometer 2 of the usual construction which is rigidly fixed to a frame 3 and secured to the support $y$ by a screw 4. The upper end of the gaging spindle is provided with gear teeth $u$ which mesh with a gear wheel $x$ mounted on an operating spindle $v$ the outer end of which is provided with a ribbon and ring $z$. The parts in this form are disposed in a different manner than in the form shown in Fig. 1 but bear the same general relation with respect to each other and operate in substantially the same manner as in the preferred construction.

In the form shown in Fig. 6 the gaging spindle 8 is provided with worm teeth and is operated by a worm wheel 5 mounted upon an operating spindle 9. A spool 7 and a ribbon 6 provided with a ring comprise the manually operable means for displacing the gaging spindle through the aforesaid connection.

In the form shown in Fig. 7 a support 18 is provided for an operating spindle 17 which carries a spool 12 and a ribbon 15 adapted to be operated in the manner hereinbefore set forth in connection with the other forms of the invention. 19 designates a bearing for one end of the spindle 17. A spring 11 may be disposed within the pulley 10, mounted on the spindle 17, and the foregoing device may serve to operate the gaging spindle by means of a belt or like transmission device 15 trained about the pulley 10 and upper smooth portion 14 of the gaging spindle. In order to maintain the belt 15 taut and to guide it during longitudinal movement of the part 14 a device may be provided in the form of an idler 16 mounted upon an arm 16′. It will be obvious that by pulling the ribbon 13 the pulley 10 may be operated in one direction whereas by means of the spring 11 said pulley will be operated in an opposite direction thereby effecting the desired reverse movement of the gaging spindle through the medium of parts hereinbefore set forth.

In Fig. 8 the upper end of the gaging spindle designated by 20 is provided with a continuously smooth surface and is adapted to be rotated in opposite directions by frictional engagement of a wheel 21 which may if desired be provided with a tread portion formed of rubber or like material.

In Fig. 9 the ribbon and spool are dispensed with and in the place thereof a rack 22 provided with a suitable finger piece or operating end 27 is provided said rack engaging a pinion 23 fixed upon the spindle 24. The rack is designed to act against the resistance of a spring 28 mounted in a casing 25 and preferably suitable means may be interposed between the spring 28 and gaging spindle 26 to communicate rotation to the latter through the medium of the foregoing parts.

In Fig. 10 the gaging spindle is provided with an extension 31 mounted in bearings 34 and 35. Between said bearings and upon the extension 31 is disposed a single member comprising a spool 29 adapted to receive a ribbon 30 and a ring 32 in which a spring 33 is mounted. Said spring 33 may be secured at one end to the ring 32 and at its other end to any suitable stationary part such as the bearing 34 and operates the same as in the constructions hereinbefore described. The extension 31 is provided with a longitudinally disposed groove 37 to which the member comprising the ring 32 and spool 29 is keyed as at 36. It will be obvious from the foregoing that as the ribbon 30 is unwound from the spool 29 the extension 31 will be rotated through the key and slot 36 and 37 and the spring 33 will be placed under tension. Such rotation of the extension 31 will act through the threaded connection of the gaging spindle with its support to displace the spindle away from the table. When the ribbon 30 is released the spring 33 which has been placed under tension will reverse the direction of rotation of the extension 31 and displace it toward the table.

It will be seen from the foregoing that the invention includes in combination with a gaging spindle, having threaded connection with its support, and a suitable support for the article to be measured, means preferably acting automatically and operatively associated with the gaging spindle to displace it toward the table and means associated with the spindle, and preferably acting through said first mentioned means, for displacing the spindle away from said table.

I claim:

1. A measuring device comprising in combination, a gaging spindle provided on its upper end with relatively long longitudinally disposed gear teeth, a support for said spindle with which the same has screw connection, a table for supporting the article to be measured, a pinion with which said gear teeth are adapted to slidably mesh, a spring associated with said pinion for normally displacing said spindle toward said table, and manually operable means associated with said pinion for displacing said spindle away from said table.

2. A measuring device comprising in combination, a gaging spindle provided on its upper end with relatively long longitudinally disposed gear teeth, a support for said spindle with which the same has screw connections, a table for supporting the article to be measured, an operating pinion with which said gear teeth are adapted to slidably mesh, an operating spindle carrying said pinion, a spring associated with said operating spindle for automatically displacing said gaging spindle toward said table, a spool for said operating spindle, and a ribbon for said spool whereby said gaging spindle may be displaced away from said table.

3. A measuring instrument comprising in combination, a threaded gaging spindle, a support with which said spindle has threaded connection, a table or support for the article to be measured, yieldingly acting means for displacing said spindle toward said table, and a device acting through said means whereby said spindle may be displaced away from said table, said device placing said means under tension in the performance of its function.

4. A measuring instrument comprising in combination, a threaded gaging spindle, a support with which said spindle has threaded connection, a table or support for the article to be measured, automatic means slidably and operably engaging said spindle for displacing the same toward said table, and means associated with said spindle whereby displacement of the same may be effected away from said table.

5. A measuring instrument comprising in combination, a gaging spindle, supporting mechanism engaging said spindle and effecting longitudinal movement thereof when said spindle is rotated, means slidably engaging said spindle to rotate the same and to effect longitudinal displacement thereof in one direction, and a manually operable device acting through said means whereby displacement of said spindle may be effected in an opposite direction.

6. A measuring instrument comprising in combination, a threaded gaging spindle, a support with which said spindle has threaded connection, a table or support for the article to be measured, and means including gear elements having a sliding mesh engagement for displacing the spindle toward said table.

7. A measuring instrument comprising in combination, a gaging spindle, a support in which said spindle is movably mounted, a table for the article to be measured, and automatic means including gears having a sliding mesh engagement for displacing said spindle toward said table.

In testimony whereof I affix my signature in presence of two witnesses.

CH. SCHEIBENSTOCK, Fils.

Witnesses:
GRACE L. PHILLIPS,
C. L. PHILLIPS.